United States Patent [19]

Blanchart et al.

[11] Patent Number: 4,536,272

[45] Date of Patent: Aug. 20, 1985

[54] POROUS ELECTRODE

[75] Inventors: Alain P. O. Blanchart, Balen; Ludovicus C. M. Adriaensen, Deerlijk, both of Belgium

[73] Assignee: Electrochemische Energieconversie N.V., Mol, Belgium

[21] Appl. No.: 610,802

[22] Filed: May 16, 1984

[30] Foreign Application Priority Data

May 19, 1983 [NL] Netherlands ............... 8301780

[51] Int. Cl.³ ............. C25B 11/04; C25B 11/08
[52] U.S. Cl. ................. 204/294; 204/290 R; 204/292; 427/372.2; 429/218; 429/42; 429/45
[58] Field of Search ........... 204/290 R, 292, 294; 429/218, 42, 45; 427/372.2

[56] References Cited

U.S. PATENT DOCUMENTS

| | | | |
|---|---|---|---|
| 3,423,246 | 1/1969 | Prager et al. | 133/120 |
| 3,733,221 | 5/1973 | Sandler et al. | 136/120 |
| 4,104,197 | 8/1978 | Heffler | 252/425.3 |
| 4,175,055 | 11/1979 | Goller et al. | 252/425.3 |
| 4,278,525 | 7/1981 | Gestaut | 204/294 |
| 4,337,140 | 6/1982 | Solomon | 204/292 |
| 4,352,768 | 10/1982 | Epstein | 264/105 |
| 4,379,772 | 4/1983 | Solomon et al. | 204/294 |
| 4,382,875 | 5/1983 | Solomon | 204/294 |
| 4,456,521 | 6/1984 | Solomon et al. | 204/294 |
| 4,459,197 | 7/1984 | Solomon et al. | 204/294 |

FOREIGN PATENT DOCUMENTS

| | | | |
|---|---|---|---|
| 0026617 | 4/1981 | European Pat. Off. | 204/294 |
| 2012100 | 7/1979 | United Kingdom | 204/294 |

Primary Examiner—R. L. Andrews
Attorney, Agent, or Firm—Cushman, Darby & Cushman

[57] ABSTRACT

The invention relates to a porous electrode at least containing a porous catalytic layer, which layer at least contains 3–30 parts by weight of mouldable polymeric binder, 50–94 parts by weight of carbon particles and 3–47 parts by weight of hard hydrophobic polymer particles.

18 Claims, 4 Drawing Figures

POROUS ELECTRODE

The invention relates to a porous electrode containing at least a porous catalytic layer, which layer contains carbon and a polymeric binder. Such an electrode is known from the UK patent specification No. 2,012,100.

Such electrodes can be used particularly in fuel cells. During operation the fuel used penetrates into the pores of the catalytic layer and is burnt there electrochemically. The generation of electric current takes place throughout the catalytic layer and the current generated is carried off mostly via a collector system. The electrode is in contact with a suitable electrolyte which closes the circuit of current within the fuel cell and which also serves to carry off the products of the reactions occurring at the cathode and anode.

A disadvantage of the known electrode is the relatively low electrochemical performance, while its stability in time is rather unsatisfactory.

The invention provides an electrode having far better electrochemical properties and performance, under the same circumstances, than comparable electrodes according to the state of the art. Thus, electrodes according to the invention show substantially lower polarizations than comparable electrodes according to the state of the art. Electrodes according to the invention, moreover, have a far better stability than the comparable electrodes according to the state of the art. Electrode according to the state of the art, if used as anodes, show a stable potential only for about 1000 hours of operation at the same power density, whereas electrodes according to the invention, if used as anodes, still show a stable potential after about 5000 hours of operation under otherwise the same conditions.

The invention relates to a porous electrode containing at least a porous catalytic layer, which layer contains carbon and a polymeric binder, which electrode is characterized in that the catalytic layer contains at least 3-30 parts by weight of mouldable polymeric binder, 50-94 parts by weight of carbon particles and 3-47 parts by weight of hard hydrophobic polymer particles.

Preferably at least part of the carbon particles are provided with catalytically active noble metal. The expression noble metal is here taken in the broader sense and comprises elements such as platinum, palladium, iridium, rhodium, silver and gold and mixtures of two or more of such elements. The noble metals particularly eligible for use in the porous electrode according to the invention are platinum and palladium or a mixture thereof. Particularly 10-90% (wt) of the carbon particles are provided with catalytically active noble metal. The metal particles may well be unevenly distributed over the metal-containing carbon particles. For instance, part of these carbon particles may contain a relatively high concentration of catalytically active metal and another part a lower concentration. The carbon type in the carbon particles with catalytically active metal may differ from the carbon type in the other carbon particles.

The porosity of the catalytic layer may be the same over the entire thickness of the porous layer, but may also increase or decrease, either continuously or stepwise, over the thickness.

Moldable polymeric binder is understood to mean a polymer of which particles, if subjected, together with carbon particles, to sufficient shearing forces, for instance in a ball mill, are moulded to form coherent networks of polymer in which the carbon particles are incorporated and in which the polymer connects the carbon particles with each other.

The moldable polymeric binder may be any suitable resin, particularly an apolar synthetic resin. For this purpose various resins are known, for instance polyethylene, polypropylene, polyvinylchloride, tetrafluoroethylene-hexafluoropropylene-copolymers and particularly polytetrafluoroethylene, or mixtures of these polymers. A very suitable moldable polymeric binder is a polytetrafluoroethylene containing at most 5% (wt) amorphous polymer.

Hard hydrophobic polymer particles are understood to mean water repellent particles at least substantially consisting of polymer, which particles cannot by means of shearing forces be molded to form reasonably coherent polymer chips built up from a plurality of polymer particles. Mixtures of carbon particles and these hard hydrophobic polymer particles cannot, in the manner described above for moldable polymeric binders, be moulded to form the coherent carbon-containing polymer networks.

Suitable as hard hydrophobic polymer particles are hard particles consisting at least substantially of hard polytetrafluoroethylene and/or tetrafluoroethylene-hexafluoropropylene-copolymers, with hard polytetrafluoroethylene being preferred.

It is preferred that the moldable polymeric binder contained in the catalytic layer at least substantially consists of mouldable polytetrafluoroethylene and the hard hydrophobic polymer particles at least substantially consist of hard polytetrafluoroethylene prepared from the same mouldable polytetrafluoroethylene.

In order to guarantee sufficient hardness the hard hydrophobic polymer particles perferably contain at least 10% (wt) amorphous polymer. In order to guarantee sufficient breaking strength these particles preferably contain at most 60% (wt) amorphous polymer, more preferably at most 50% (wt) amorphous polymer, and particularly at most 40 % (wt) amorphous polymer. Polytetrafluoroethylene with a high content of amorphous polymer is described in the U.S. Pat. No. 4,187,390.

A very suitable manner to produce hard polytetrafluoroethylene particles consists in subjecting particles of a moldable polytetrafluoroethylene for 1s–5 hours, preferably for 5s–2 hours, to a heat treatment at 550–700 K., preferably 600–650 K., before using them for the production of the catalytic layer.

The electrode preferably contains a porous metal collector, which in practice consists of, for instance, a metal gauze with a wire thickness of about 50–300 $\mu$m and a mesh width of about 200–1500 $\mu$m or a comparable perforated metal plate. Stretch material can be used also. The metal gauze of the collector may be made of any suitable material, for instance nickel or steel. The collector material may be surrounded by a contiguous collector coating of an electrically conducting resin or a mixture of resin and conducting material, for instance carbon, in order to inhibit corrosion of the collector.

For the correct operation of the electrode it is usually important that the collector be situated on the electrolyte side of the catalytic layer. This has advantages also in the production of the electrode.

The electrodes according to the invention may be made in any suitable way. For instance, powdered carbon is brought together, for instance in a suitable mold, with a powder of the catalytically active metal on carbon, powdered moldable polymeric binder, e.g. mouldable polytetrafluoroethylene, and powdered hard hydrophobic polymer particles, e.g. hard polytetrafluoroethylene particles, and possibly a pore former, after which the pore former can be lixiviated, for instance with hot water. The pore formers may be soluble salts, such as sodium sulphate, sodium carbonate, ammonium carbonate and the like.

It is advantageous first to separately produce the catalytic layer and the collector and then to press the collector at least partly into the layer obtained. A very firm electrode with good porosity properties is thus obtained. The catalytic layer may also be formed in situ by deposition onto the collector.

In the electrodes according to the invention the layer containing the catalyst, which layer is sufficiently porous to allow gas and liquid to pass, preferably adjoins a layer that is impervious to liquid, but pervious to gas. This layer, which is pervious only to gas, preferably consists of a porous polytetrafluoroethylene layer with a thickness of preferably 100–250 μm and a porosity of preferably 25–75%. During operation the layer that is pervious to gas and liquid is in contact with the electrolyte, for instance a sodium-hydroxide or potassium-hydroxide solution or a phosphoric-acid solution, and the layer that is pervious to gas only is in contact with the gas. At the anode the gas consists in the gaseous fuel, for instance hydrogen. At the cathode the gas consists in oxygen or a gas containing molecular oxygen, for instance air.

Neither the finished electrode according to the invention nor the finished catalytic layer may be subjected to a so-called sintering treatment as described, for instance, in the French patent application No. 2,180,488.

EXAMPLES AND COMPARATIVE EXPERIMENTS

The moldable polymeric binder used in all examples and comparative experiments was Teflon ®10N of the firm of du Pont de Nemours. The hard polytetrafluoroethylene particles used in the electrodes applied in the examples were produced by subjecting Teflon ®10N powder for one hour to a heat treatment at 643 K.

The electrodes for the examples as well as for the comparative experiments were all produced as described in the example of the British patent application No. 2,012,100 the composition of the catalytic layer being varied in the manner indicated.

In the examples as well as in the comparative experiments the electrodes were tested in a semi-cell at 338 K. under the following conditions:
electrolyte: 6N KOH solution in water.
fuel (anode): hydrogen under a gauge pressure of 100 Pa in an excess of 5% in respect of the stoechiometrically required quantity.
oxydant (cathode): $CO_2$-free air under a gauge pressure of 30 Pa in an excess of 200% in respect of the stoechiometrically required quantity.

The electrode characteristics have been measured by means of a LUGGIN capillary. The measured potentials have been related to a RHE (reversible hydrogen electrode) which was situated in the same environment. The results of the examples and of the comparative experiments are given in the figures.

DETAILED DESCRIPTION OF THE DRAWINGS

EXAMPLE I

An electrode was produced having a catalytic layer consisting of:
17% (wt) carbon particles consisting of 95% (wt) active carbon and 5% (wt) platinum,
68% (wt) active carbon,
7.5% (wt) Teflon ®10N, and
7.5% (wt) hard polytetrafluoroethylene particles with about 33% (wt) amorphous polymer.

Figure 1:
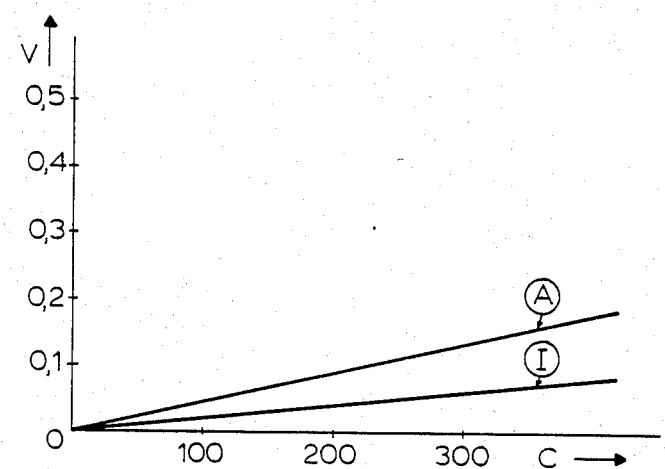
FIGS. 1 and 3 show potential V in volts of the electrode according to the invention in relation to the RHE as function of power density C in mA/cm$^2$ and FIGS. 2 and 4 show potential V in volts of the electrode according to the invention in relation to the RHE as function of the number of hours H for which the experiment lasted with an unchanged power density of 150 mA/cm$^2$.
Figure 2:
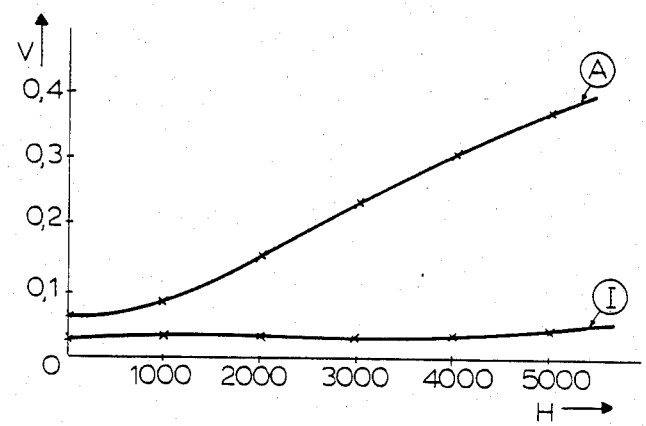

This electrode was used as anode. The results of the experiments are shown as lines I in FIGS. 1 and 2.

COMPARATIVE EXPERIMENT A

An electrode was produced having a catalytic layer consisting of:
17% (wt) carbon particles consisting of 95% (wt) active carbon and 5% (wt) platinum,
68% (wt) active carbon, and
15% (wt) Teflon ®10N.

This electrode was used as anode under otherwise exactly the same conditions as in example I. The results of the experiment are shown as lines A in FIGS. 1 and 2.

EXAMPLE II

An electrode was produced having a catalytic layer consisting of:
60% (wt) carbon particles consisting of 95% (wt) graphite and 5% (wt) platinum,
25% (wt) active carbon,
7.5% (wt) Teflon ®10N, and
7.5% (wt) hard polytetrafluoroethylene particles with about 33% (wt) amorphous polymer.

Figure 3:
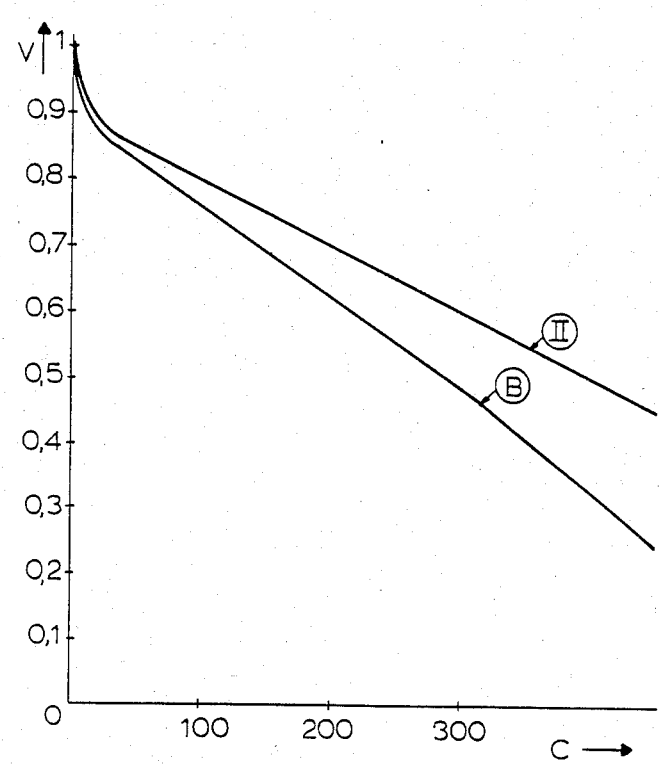
Figure 4:
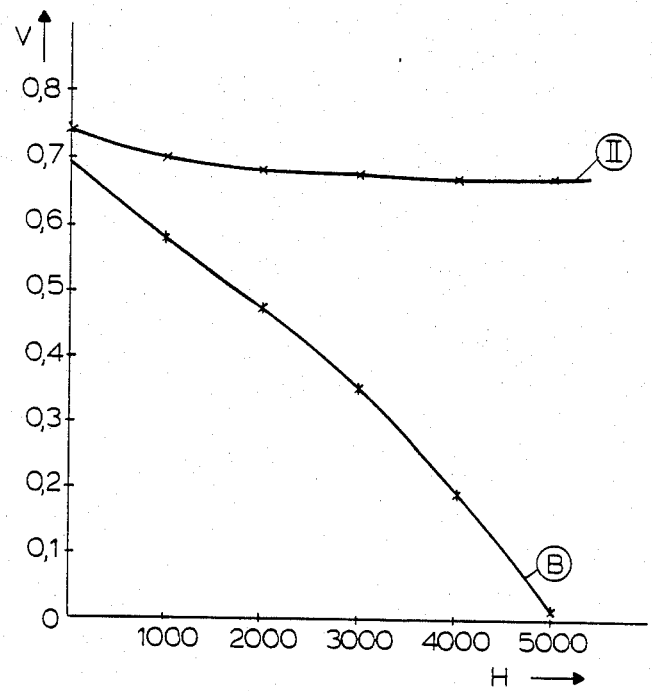

This electrode was used as cathode. The results of the experiment are shown as lines II in FIGS. 3 and 4.

COMPARATIVE EXPERIMENT B

An electrode was produced having a catalytic layer consisting of:
60% (wt) carbon particles consisting of 95% (wt) graphite and 5% (wt) platinum,
25% (wt) active carbon, and
15% (wt) Teflon ®10N.

This electrode was used as cathode under otherwise exactly the same conditions as in example II. The results of the experiments are shown as lines B in FIGS. 3 and 4.

From the above it will be perfectly clear that the polarization shown by the electrodes according to the invention is much lower than shown by the electrodes according to the state of the art, while the electrodes according to the invention, moreover, show a far greater stability in time.

We claim:

1. A porous electrode including a porous catalytic layer which comprises at least 3–30 parts by weight of moldable polymeric binder, 50–94 parts by weight of carbon particles, and 3–47 parts by weight of hard hydrophobic polymer particles.

2. A porous electrode according to claim 1, wherein a major portion of the moldable polymeric binder is polytetrafluoroethylene.

3. A porous electrode according to claim 2, wherein the moldable polymeric binder is at most 5% by weight amorphous polymer.

4. A porous electrode according to claim 1, wherein a major portion of the hard hydrophobic polymer is hard polytetrafluoroethylene.

5. A porous electrode according to claim 1, wherein a major portion of the hard hydrophobic polymer is hard tetrafluoroethylene-hexafluoropropylene-copolymer.

6. A porous electrode according to claim 1, wherein a major portion of the hard hydrophobic polymer consists of a mixture of hard polytetrafluoroethylene and hard tetrafluoroethylene-hexafluoropropylene-copolymer.

7. A porous electrode according to claim 1, wherein a major portion of the moldable polymeric binder is moldable polytetrafluoroethylene and a major portion of the hard hydrophobic polymer is hard polytetrafluoroethylene prepared from the same moldable polytetrafluoroethylene.

8. A porous electrode according to claim 1, wherein the hard hydrophobic polymer particles contain at least 10% (wt) amorphous polymer.

9. A porous electrode according to claim 1, wherein the hard hydrophobic polymer particles contain at most 60% (wt) amorphous polymer.

10. A porous electrode according to claim 1, wherein the hard hydrophobic polymer particles contain at most 50% (wt) amorphous polymer.

11. A porous electrode according to claim 1, wherein the hard hydrophobic polymer particles contain at most 40% (wt) amorphous polymer.

12. A porous electrode according to claim 1, wherein a major portion of the hydrophobic polymer is polytetrafluoroethylene that has been subjected, before being used in the production of the catalytic layer, to a heat treatment at 550–700 K. for 1s–5 hours.

13. A porous electrode according to claim 1, wherein a major portion the hydrophobic polymer is polytetrafluoroethylene that has been subjected, before being used in the production of the catalytic layer, to a heat treatment at 550–700 K. for 5s–2 hours.

14. A porous electrode according to claim 1, wherein a major portion of the hydrophobic polymer is polytetrafluoroethylene that has been subjected, before being used in the production of the catalytic layer, to a heat treatment at 600–650 K. for 5s–2 hours.

15. A porous electrode according to claim 1, further comprising a porous metal collector.

16. A porous electrode according to claim 1, wherein at least part of the carbon particles is provided with catalytically active noble metal.

17. A porous electrode according to claim 1, wherein at least part of the carbon particles is provided with catalytically active noble metal and the catalytically active noble metal is palladium and/or platinum.

18. A porous electrode according to claim 1, wherein 10–90% (wt) of the carbon particles is provided with catalytically active noble metal.

* * * * *